No. 691,762. Patented Jan. 28, 1902.
P. P. & P. F. HAERTL.
COTTON HARVESTER.
(Application filed Aug. 1, 1901.)
(No Model.) 5 Sheets—Sheet 1.
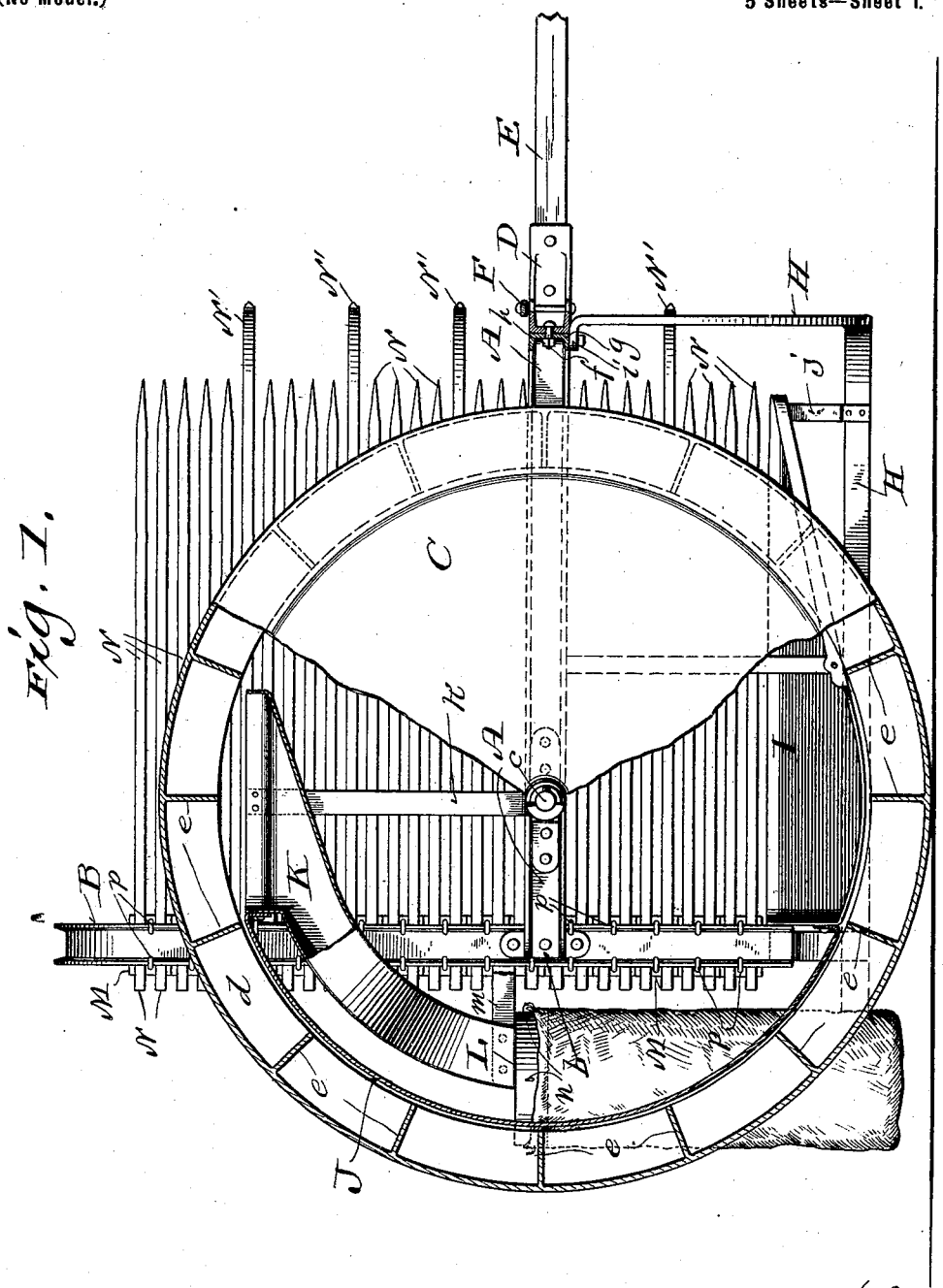

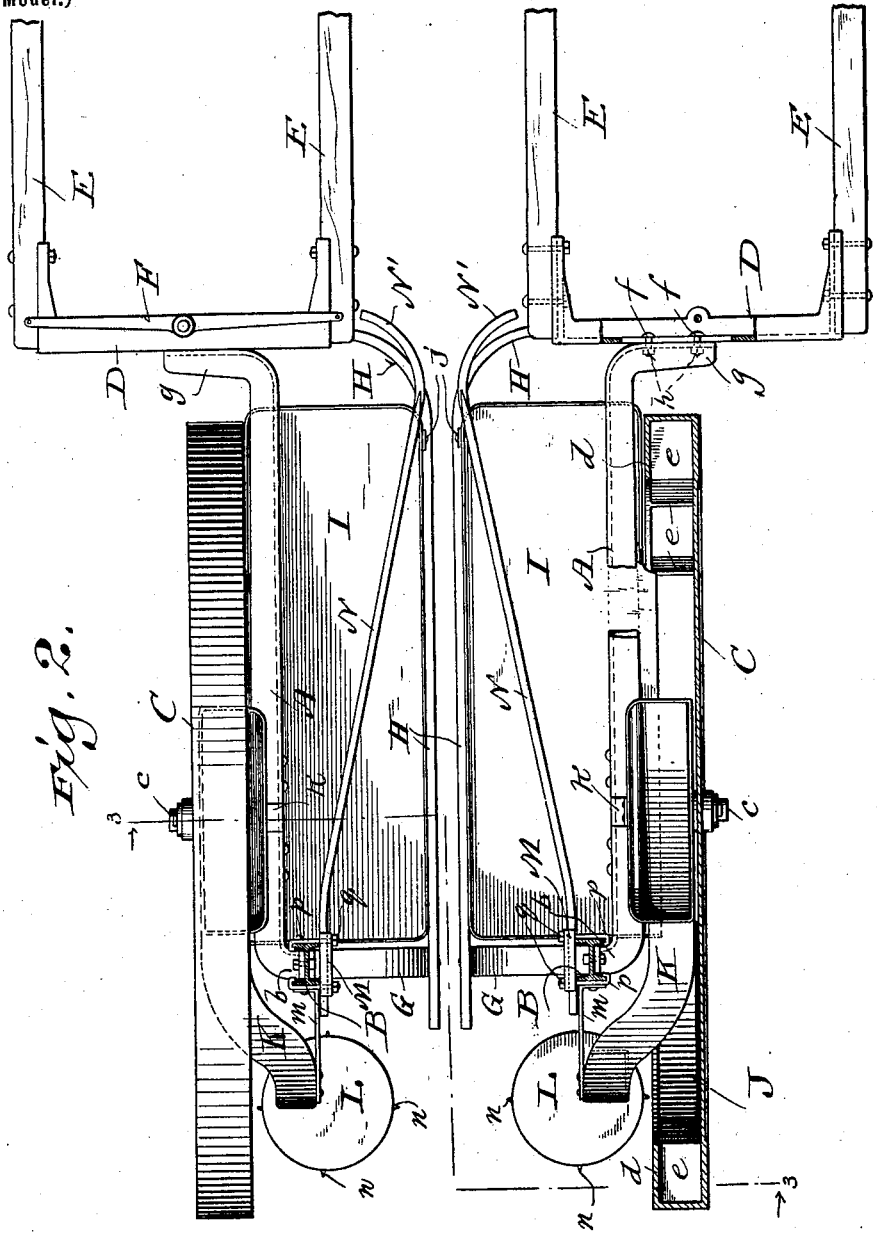

No. 691,762. Patented Jan. 28, 1902.
P. P. & P. F. HAERTL.
COTTON HARVESTER.
(Application filed Aug. 1, 1901.)
(No Model.) 5 Sheets—Sheet 3.
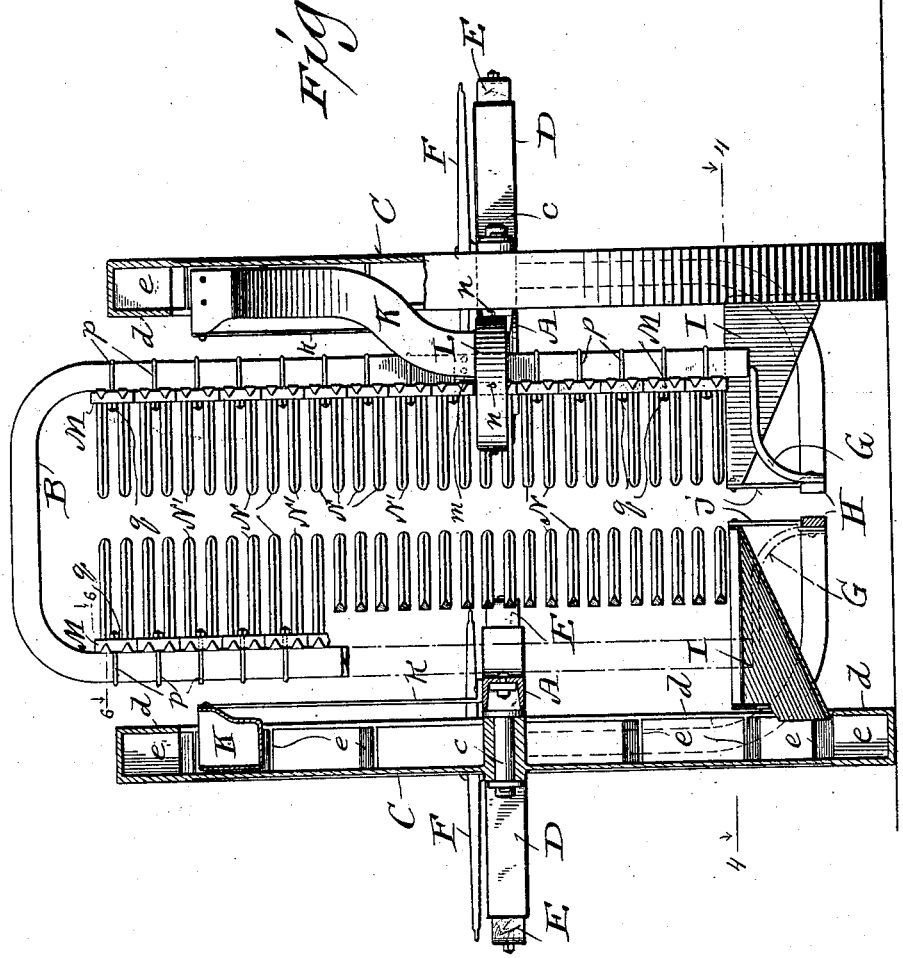

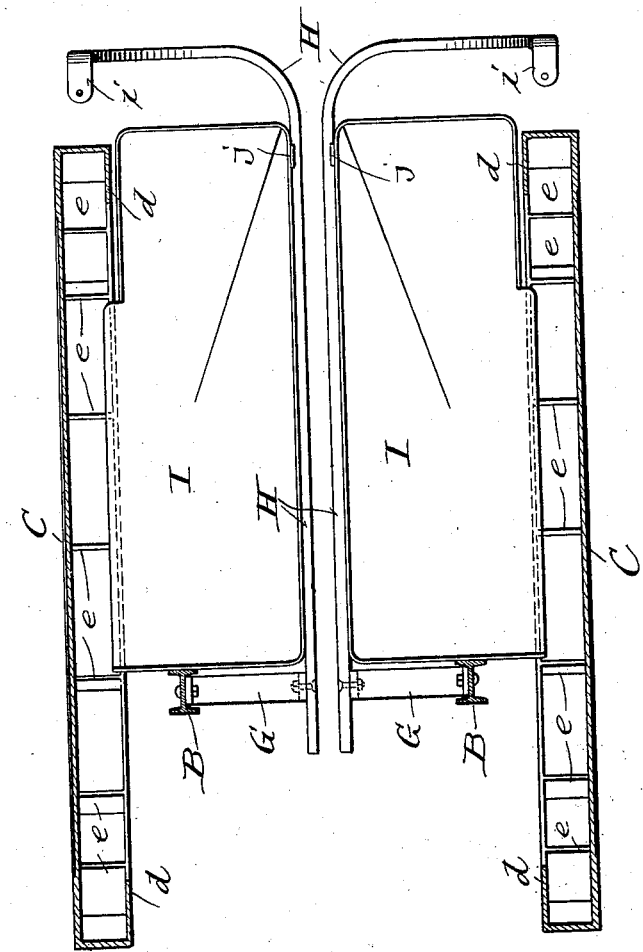

No. 691,762. Patented Jan. 28, 1902.
P. P. & P. F. HAERTL.
COTTON HARVESTER.
(Application filed Aug. 1, 1901.)
(No Model.) 5 Sheets—Sheet 5.
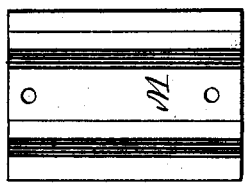
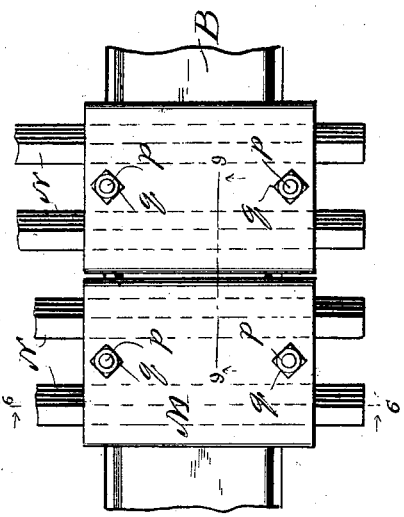
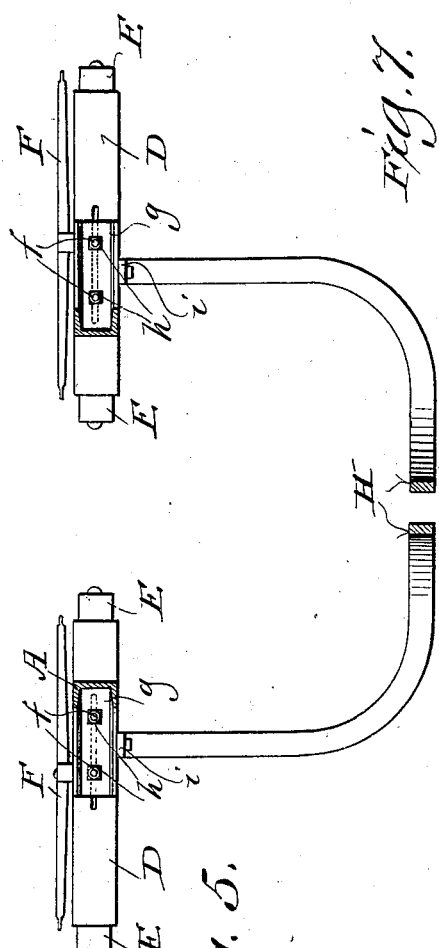
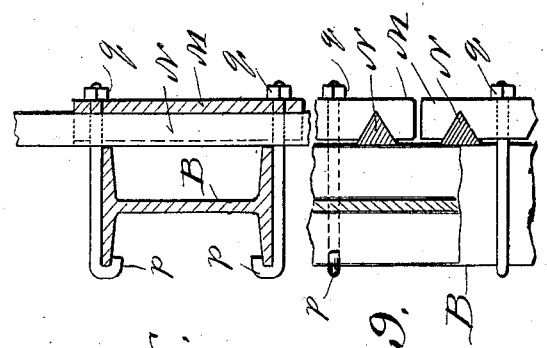
Witnesses:
Geo. W. Young,
N. E. Oliphant
Inventors
Peter P. Haertl
Peter F. Haertl
H. G. Underwood

UNITED STATES PATENT OFFICE.

PETER P. HAERTL, OF BEAVERDAM, WISCONSIN, AND PETER F. HAERTL, OF SHREVEPORT, LOUISIANA.

COTTON-HARVESTER.

SPECIFICATION forming part of Letters Patent No. 691,762, dated January 28, 1902.

Application filed August 1, 1901. Serial No. 70,452. (No model.)

*To all whom it may concern:*

Be it known that we, PETER P. HAERTL, a resident of Beaverdam, in the county of Dodge and State of Wisconsin, and PETER F. HAERTL, a resident of Shreveport, in the parish of Caddo and State of Louisiana, citizens of the United States, have invented certain new and useful Improvements in Cotton-Harvesters; and we do hereby declare that the following is a full, clear, and exact decription thereof.

Our invention has for its object to provide simple, economical, durable, and efficient cotton-harvesters, the same consisting in what is hereinafter particularly set forth with reference to the accompanying drawings and subsequently claimed.

Figure 1 of the drawings represents a partly-sectional elevation of a cotton-harvester in accordance with our invention, viewed from the side; Fig. 2, a plan view of the same, partly in horizontal section; Fig. 3, a rear elevation of the harvester partly broken and in section, this view being indicated by line 3 3 in the second figure; Fig. 4, a horizontal section view indicated by line 4 4 in the third figure; Fig. 5, a detail partly-sectional rear elevation illustrating an adjustable connection of thills with the harvester-frame; Fig. 6, a detail sectional view indicated by lines 6 6 in the third and seventh figures; Fig. 7, a detail elevation of a plurality of parts in the same assemblage as shown in the sixth figure; Fig. 8, a detail inside view of a clamp-plate; and Fig. 9, a sectional view indicated by line 9 9 in the seventh figure.

Referring by letter to the drawings, A indicates each of a pair of horizontal parallel channel-iron beams bent inward at their rear ends and outward at their forward ends. Bolted to the inner rear ends $b$ of the beams are vertical branches of an I-iron yoke B, and likewise connected to said beams forward of the yoke are flanges of spindles $c$, engaging hubs of a pair of outwardly-closed wheels C, each provided with an inner annular rim-flange $d$ and radial partitions $e$, these partitions being arranged at regular intervals to divide the space between said flange and outer wall of the wheel into a series of pockets.

The beams A and yoke B constitute the harvester-frame, and slotted channel-iron cross-bars D of thills E are adjustable on bolts $f$, engaging the outwardly-bent forward ends $g$ of the frame-bars, nuts $h$ being run on the bolts to clamp the thill-bars in adjusted position. Each of the thill-bars is shown provided with forwardly-extending upper and lower ears, and a singletree F is in pivotal connection with the ears.

Connected by braces G with ends of yoke B are rails H, parallel and horizontal central of the harvester in the direction of its draft; but at the front these rails are turned outward, extended transversely in opposite directions, and bent upward under the forward ends $g$ of frame-beams A, flanged extremities $i$ of said rails being bolted or otherwise rigidly secured to said beams. Connected by a brace $j$ with the forward horizontal lower portion of each rail H is an inclined forward portion of a hopper I, the deepest portion of which is concave at the bottom, where it overlaps the pocket-space of an adjacent wheel C, to which it is open.

Curved shields J, concentric with the wheels C, connect the rear ends of hoppers I with conveyer-spouts K, supported by braces $k$ $m$ in union with frame-bars A and yoke B aforesaid, the lower ends of the spouts being shown in the form of horizontal drum-like shells L, open at the bottom and provided with outer radial hooks $n$, upon which to hang bags. The upper ends of spouts K are flaring over the centers of wheels C under the pocket-spaces of same, and said wheels discharge into said spouts.

By means of clamp-plates M, hook-bolts $p$, and plate-opposing nuts $q$ the rear ends of fingers N (preferably triangular in cross-section) are held fast against the inner flanges of the vertical branches of yoke B above the rails H, these fingers being forwardly converging in pairs and pointed. Likewise connected to said yoke branches are the rear ends of other fingers N', longer than those aforesaid and at greater intervals apart, these long fingers being also preferably triangular in cross-section, forwardly converging in pairs parallel to the shorter fingers as far as the points of same, and then outwardly curved in opposite directions.

In practice the thills of the harvester are adjusted with respect to width between rows in a cotton-field and the draft-team is driven so that the rails H travel on opposite sides of the plants in a row. The curved ends of fingers N' guide the plants in between the rails H and with the other fingers N cause the ripe cotton-bolls to detach themselves from said plants, said fingers N being pointed, so as to facilitate their penetration of the aforesaid plants. The detached cotton-bolls fall into hoppers I and find their way into pockets of wheels C to be elevated back of shields J, discharged into spouts K, and finally caught in bags suspended from said spouts.

The fingers N N' of the harvester are connected with yoke B or removed therefrom, as the ripening of the cotton-bolls at different elevations of the plants may require, it not being desirable to use more of said fingers at any time than is deemed necessary to the best results. Owing to the forward convergence of the fingers in pairs, it will be understood that they have lateral movement through the cotton-plants simultaneous with forward travel of the harvester, and thus the best results are attained.

Having thus described our invention, what we claim as new, and desire to secure by Letters Patent, is—

1. A cotton-harvester having wheels provided with pockets circumferentially thereof open toward the hubs, rails horizontally parallel central of the machine in the direction of its draft, hoppers arranged to discharge into the pocket-spaces of the wheels under said hubs, spouts arranged to have their upper ends over the wheel-hubs, under said pocket-spaces, rear shields concentric with said wheels inside the same between the hoppers and upper ends of the spouts, means for holding open bags in suspension under said spouts, and forwardly-converging fingers in series connected to vertical rear portions of the machine-frame above the aforesaid rails.

2. A cotton-harvester having wheels provided with pockets circumferentially thereof open toward the hubs, rails horizontally parallel central of the machine in the direction of its draft, hoppers arranged to discharge into the pocket-spaces of the wheels under said hubs, spouts arranged to have their upper ends over the wheel-hubs under said pocket-spaces, shields concentric with said wheels inside the same between the hoppers and upper ends of the spouts, means for holding open bags in suspension under said spouts, forwardly-converging pointed fingers in series connected to vertical rear portions of the machine-frame above the aforesaid rails, and other forwardly-converging but longer fingers also connected to said vertical portions of the machine-frame at greater intervals apart than those aforesaid and having their forward ends outwardly curved in opposite directions.

3. A cotton-harvester having the cross-bars of thills in adjustable connection with its frame and provided with wheels having pockets circumferentially thereof open toward the hubs, rails horizontally parallel central of the machine in the direction of its draft, hoppers arranged to discharge into the pocket-spaces of the wheels under said hubs, spouts arranged to have their upper ends over the wheel-hubs under said pocket-spaces, rear shields concentric with said wheels inside the same between the hoppers and upper ends of the spouts, means for holding open bags in suspension under said spouts, and forwardly-converging fingers in series connected to vertical rear portions of the machine-frame above the aforesaid rails.

4. A cotton-harvester having a frame comprising horizontal beams and a vertical bow in connection with the beams, spindles in union with said beams, wheels on the spindles provided with circumferential pockets open toward the hubs, rails horizontally parallel central of the machine in the direction of its draft, hoppers arranged to discharge into the pocket-spaces of the wheels under said hubs, spouts arranged to have their upper ends over the wheel-hubs under said pocket-spaces, rear shields concentric with said wheels inside the same between the hoppers and upper ends of the spouts, means for holding bags open in suspension under said spouts, and forwardly-converging fingers clamped at their rear ends against inner vertical portions of the aforesaid bow above the aforesaid rails.

In testimony that we claim the foregoing we have hereunto set our hands, at Beaverdam, in the county of Dodge and State of Wisconsin, in the presence of two witnesses.

PETER P. HAERTL.
PETER F. HAERTL.

Witnesses:
BUTLER BABCOCK,
FRANK W. JILLSON,